US012759114B2

(12) United States Patent
Chou et al.

(10) Patent No.: US 12,759,114 B2
(45) Date of Patent: Oct. 13, 2026

(54) CARRYING DEVICE

(71) Applicant: WISTRON NEWEB CORPORATION, Hsinchu (TW)

(72) Inventors: Kai-Hsiang Chou, Hsinchu (TW); Jen-Yung Chang, Hsinchu (TW); Bau-Yi Huang, Hsinchu (TW); Feng-Ming Chang, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 712 days.

(21) Appl. No.: 17/817,172

(22) Filed: Aug. 3, 2022

(65) Prior Publication Data

US 2023/0211473 A1 Jul. 6, 2023

(30) Foreign Application Priority Data

Dec. 30, 2021 (TW) ................................ 110149516

(51) Int. Cl.
*B25B 5/10* (2006.01)
*B25B 5/02* (2006.01)
(Continued)

(52) U.S. Cl.
CPC ................ *B25B 5/103* (2013.01); *B25B 5/02* (2013.01); *B25B 5/102* (2013.01); *B25B 5/145* (2013.01); *B25B 5/163* (2013.01)

(58) Field of Classification Search
CPC .. B25B 5/003; B25B 5/02; B25B 5/04; B25B 5/068; B25B 5/085; B25B 5/102;
(Continued)

(56) References Cited

U.S. PATENT DOCUMENTS 5,895,184 A * 4/1999 Walters ................ B23Q 16/001 33/642
6,398,175 B1 * 6/2002 Conner ................ B25B 1/2405 248/228.3
(Continued)

FOREIGN PATENT DOCUMENTS

CN 205859549 U 1/2017
DE 422944 C * 12/1925 ........... B25B 1/2452
(Continued)

OTHER PUBLICATIONS

Extended European Search Report dated May 25, 2023, issued in application No. EP 22192802.1.

*Primary Examiner* — Brian D Keller
*Assistant Examiner* — Aaron R McConnell
(74) *Attorney, Agent, or Firm* — McClure, Qualey & Rodack, LLP

(57) ABSTRACT

A carrying device is provided. The carrying device includes a stand, an upper clamp connected to the stand, a lower clamp assembled to the stand, a manipulation mechanism assembled to the stand and interlinked with the lower clamp, and a supporting column assembled to the lower clamp. The manipulation mechanism can drive the lower clamp to move relative to the upper clamp, and the upper clamp and the lower clamp jointly define a receiving space therebetween. The supporting column is movable relative to the lower clamp, so that the carrying device can be adjusted in a first clamping mode or a second clamping mode. When the carrying device is in the first clamping mode, the supporting column is located in the receiving space and faces toward the upper clamp, so that the supporting column and the upper clamp can jointly clamp a plate part of a first structure.

13 Claims, 13 Drawing Sheets

(51) Int. Cl.
*B25B 5/14* (2006.01)
*B25B 5/16* (2006.01)

(58) Field of Classification Search
CPC B25B 5/103; B25B 5/16; B25B 5/163; B25B 1/2415; B25B 1/2457
USPC ....... 269/139–140, 146, 271, 279, 280, 281, 269/282, 283, 284
See application file for complete search history.

(56) References Cited

U.S. PATENT DOCUMENTS

| | | | | |
|---|---|---|---|---|
| 12,285,846 | B1 * | 4/2025 | Omdahl | B25B 1/2436 |
| 2018/0045231 | A1 | 2/2018 | Xiang et al. | |
| 2018/0104787 | A1 * | 4/2018 | Richardson | B23Q 16/001 |

FOREIGN PATENT DOCUMENTS

| | | | | | |
|---|---|---|---|---|---|
| DE | 1191308 | B | * | 4/1965 | B25B 1/2452 |
| GB | 2171035 | A | * | 8/1986 | B25B 1/2426 |
| JP | 3166735 | U | | 3/2011 | |

* cited by examiner

CARRYING DEVICE

CROSS-REFERENCE TO RELATED PATENT APPLICATION

This application claims the benefit of priority to Taiwan Patent Application No. 110149516, filed on Dec. 30, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a carrying device, and more particularly to a carrying device having more than one clamping mode.

BACKGROUND OF THE DISCLOSURE

A conventional carrying device includes a stand and two clamps that are assembled to and movable relative to the stand. The two clamps of the conventional carrying device can fix to and clamp a certain structure therebetween, so that an object assembled to the conventional carrying device can be hung from the structure through the conventional carrying device. However, the conventional carrying devices have been limited to the existing structural design, and so it is difficult to alter the design for further improvements.

SUMMARY OF THE DISCLOSURE

In response to the above-referenced technical inadequacies, the present disclosure provides a carrying device to effectively improve on the issues associated with conventional carrying devices.

In one aspect, the present disclosure provides a carrying device, which includes a stand, an upper clamp, a lower clamp, a manipulation mechanism, and a supporting column. The stand has a track structure and is configured to allow an object to be detachably assembled thereon. The upper clamp is connected to the stand. The lower clamp is assembled to the track structure and faces toward the upper clamp. The lower clamp is movable along the track structure relative to the upper clamp, and the upper clamp and the lower clamp jointly define a receiving space therebetween. The manipulation mechanism is assembled to the stand and is interlinked with the lower clamp. The manipulation mechanism is configured to drive the lower clamp to move along the track structure. The supporting column is assembled to the lower clamp. The supporting column is movable relative to the lower clamp, so that the carrying device is adjustable to be in a first clamping mode or a second clamping mode. When the carrying device is in the first clamping mode, the supporting column is located in the receiving space, a free end portion of the supporting column faces toward the upper clamp, and the manipulation mechanism is configured to drive the lower clamp and the supporting column to move together, so that the free end portion and the upper clamp are capable of jointly clamping a plate part of a first structure.

In another aspect, the present disclosure provides a carrying device, which includes a stand, an upper clamp, a lower clamp, a manipulation mechanism, and a supporting column. The stand has a track structure and is configured to allow an object to be detachably assembled thereon. The upper clamp is connected to the stand. The lower clamp is assembled to the track structure and faces toward the upper clamp. The lower clamp is movable along the track structure relative to the upper clamp, and the upper clamp and the lower clamp jointly define a receiving space therebetween. The manipulation mechanism is assembled to the stand and is interlinked with the lower clamp. The manipulation mechanism is configured to drive the lower clamp to move along the track structure. The supporting column is detachably assembled to the lower clamp and is located in the receiving space, so that the carrying device is in a first clamping mode. Moreover, a free end portion of the supporting column faces toward the upper clamp, and the manipulation mechanism is configured to drive the lower clamp and the supporting column to move together, so that the free end portion and the upper clamp are capable of jointly clamping a plate part of a first structure.

Therefore, the supporting column and the upper clamp of the carrying device in the present disclosure can cooperate with each other to jointly clamp the first structure by moving or assembling the supporting column into the receiving space, so that a moving distance of the lower clamp can be effectively decreased (e.g., the moving distance of the lower clamp can be substantially decreased by a length of the supporting column), and a manipulation time of the manipulation mechanism can be significantly reduced. Accordingly, the carrying device provided by the present disclosure can be different from the existing structure.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
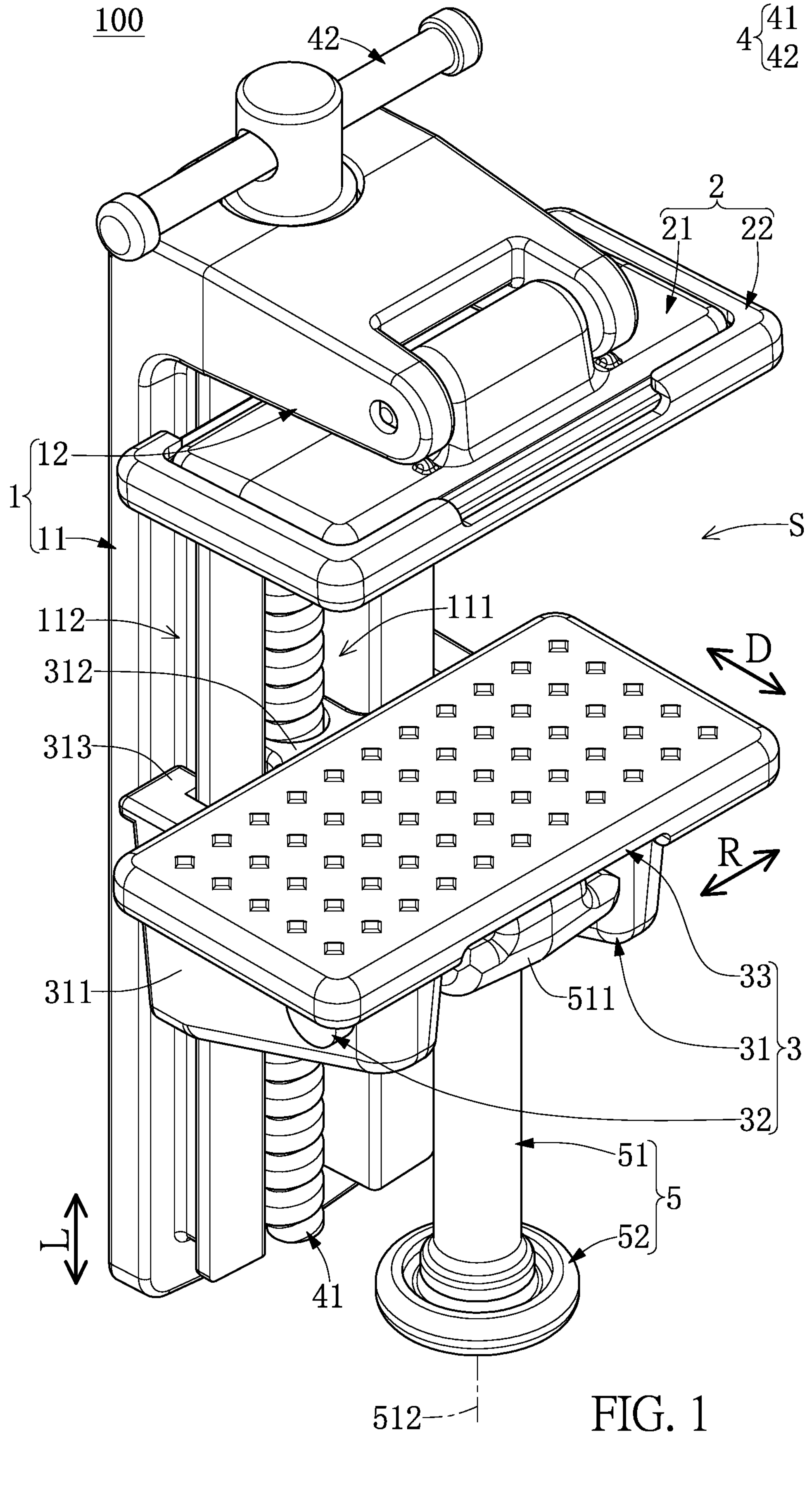
FIG. 1 is a perspective view of a carrying device being in a second clamping mode according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 5:
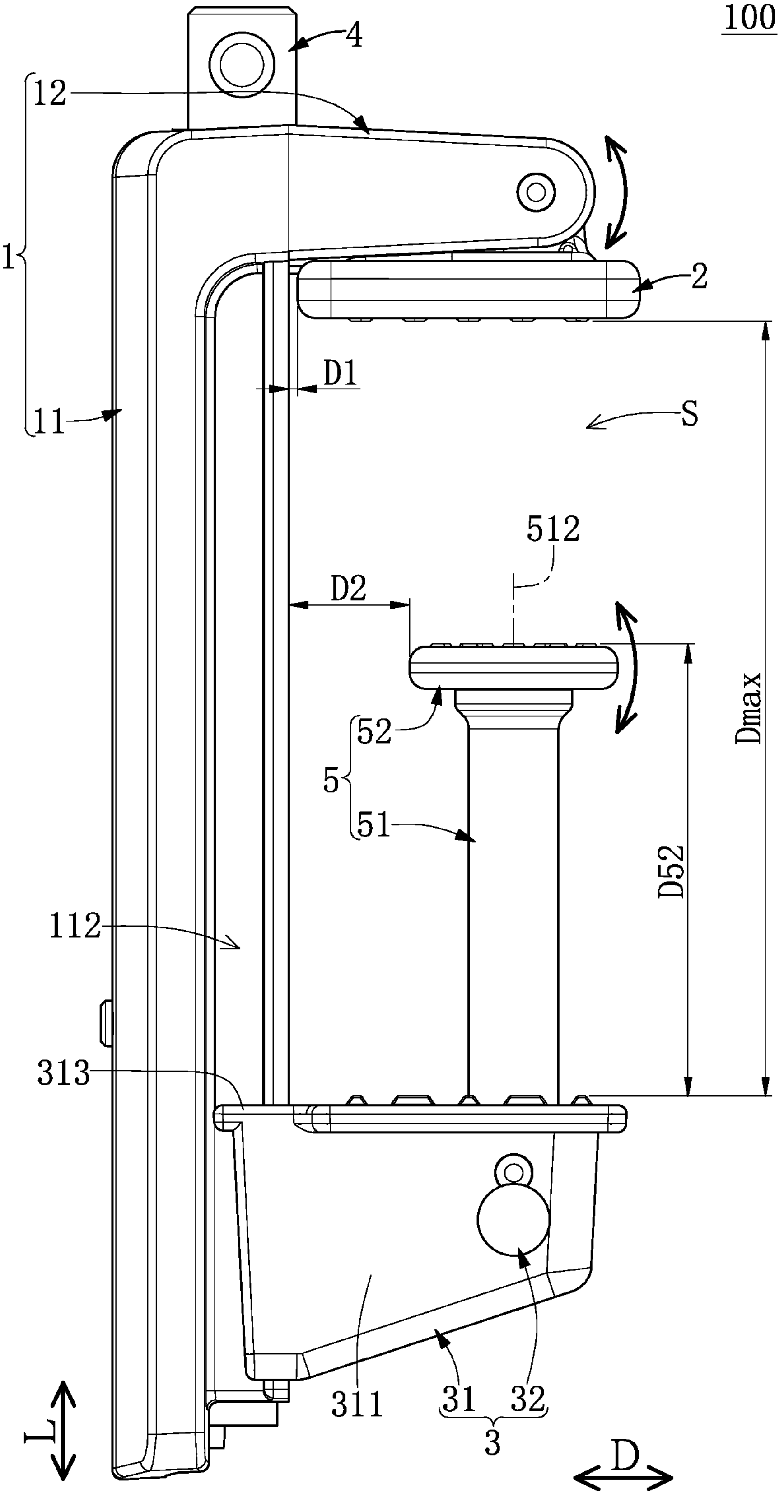
FIG. 5 is a planar view of FIG. 4.
Figure 6:
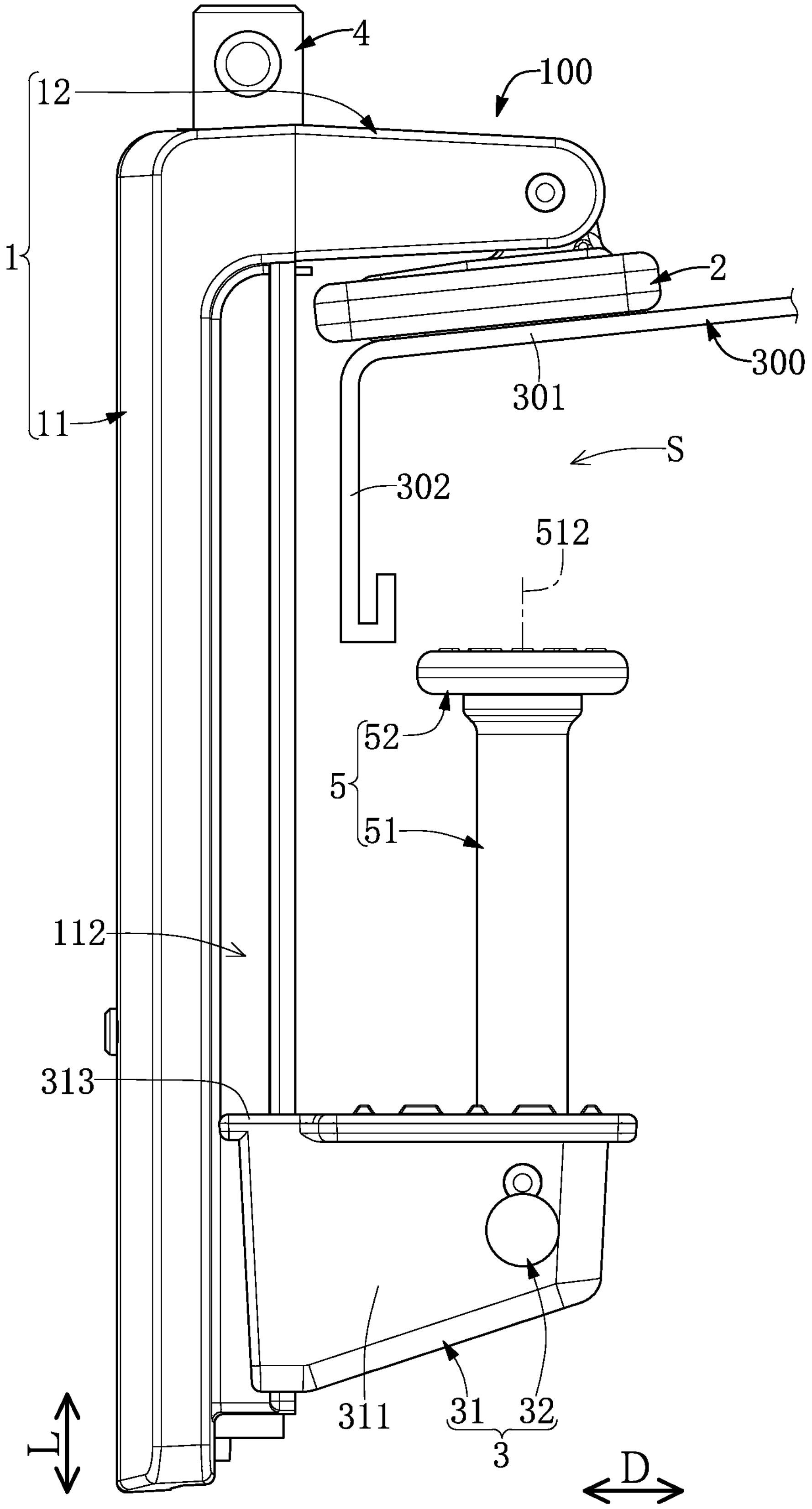
FIG. 6 and FIG. 7 are planar views showing the carrying device that is in the first clamping mode and that is used to clamp a first structure.
Figure 7:
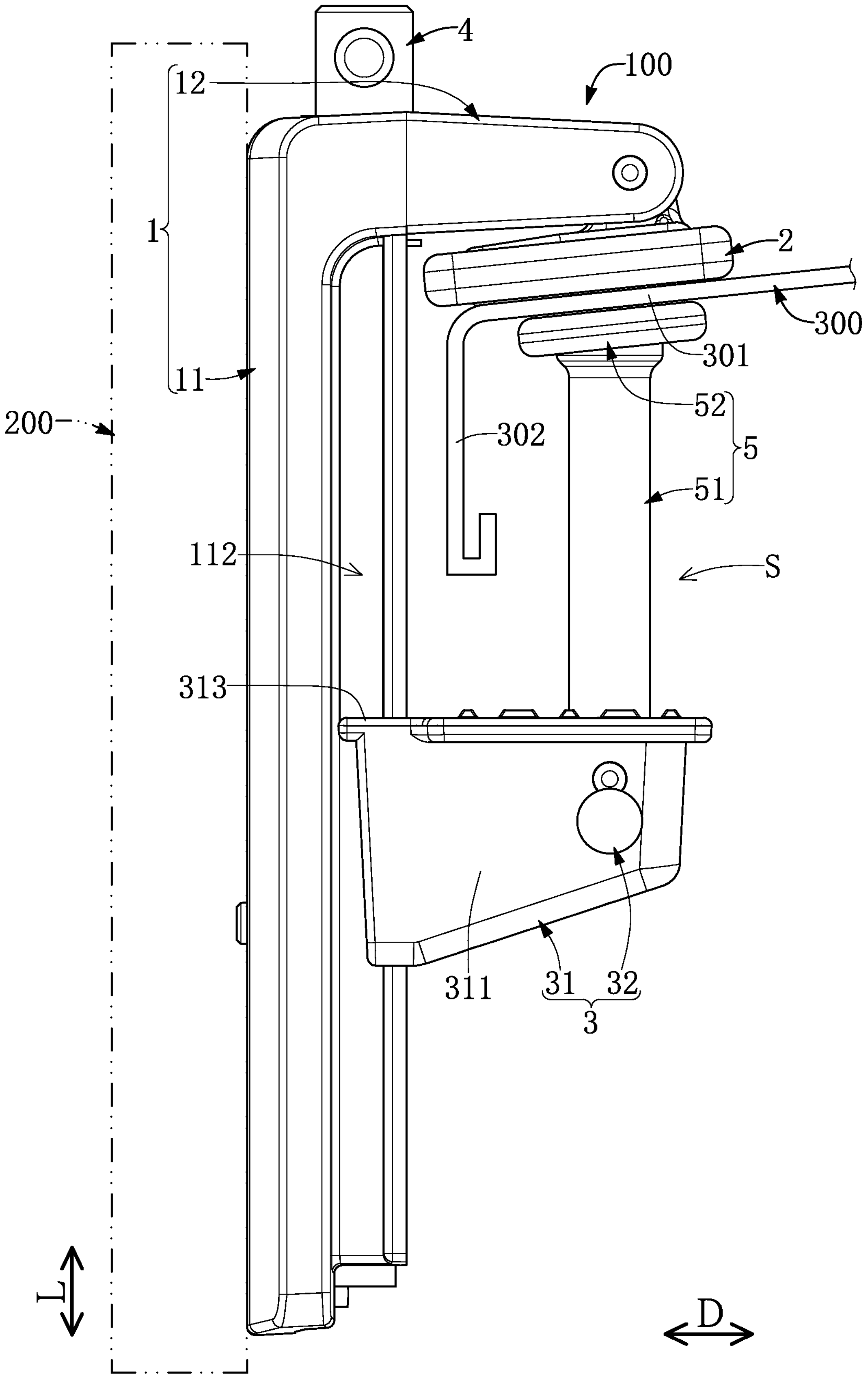
Figure 8:
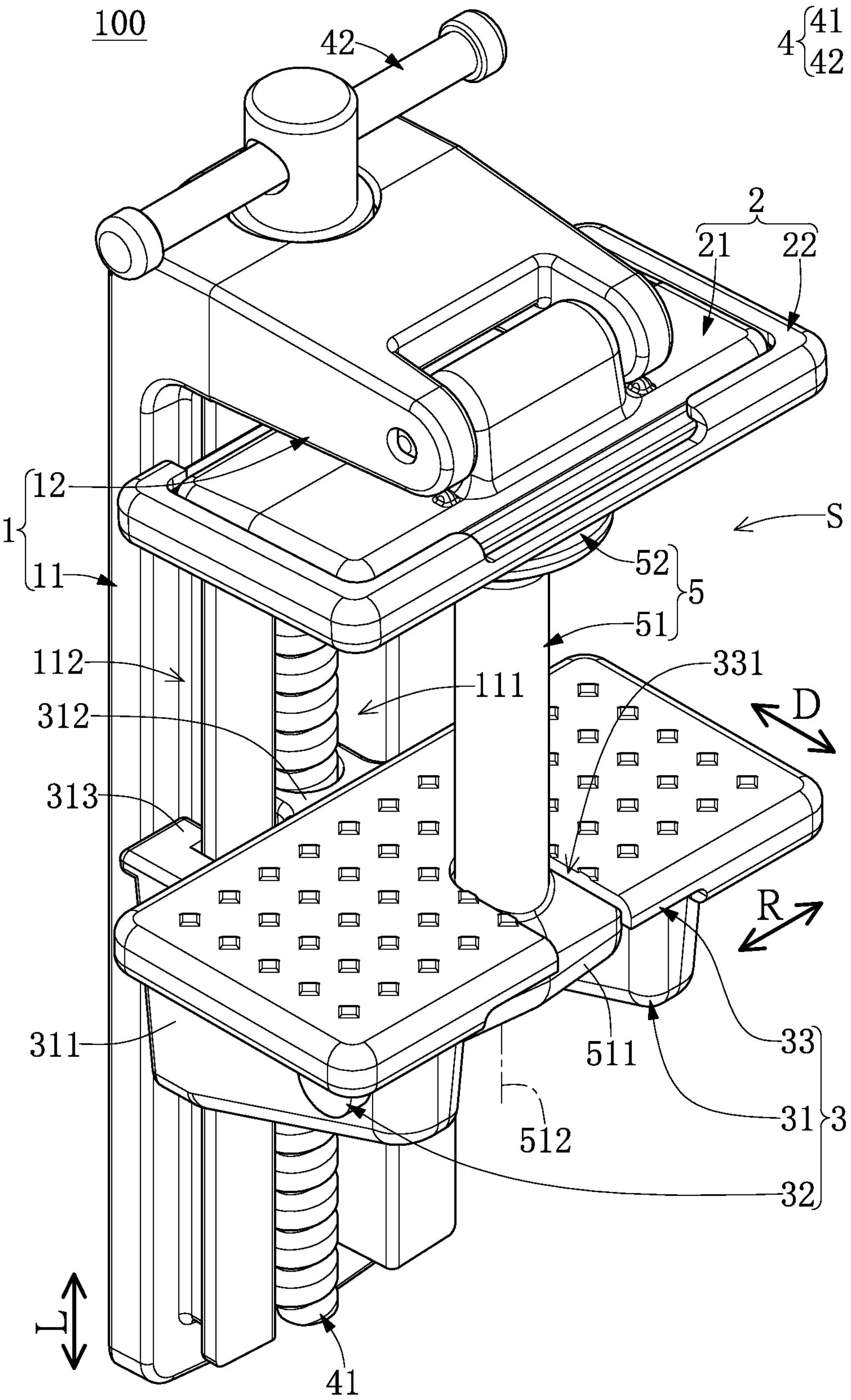
FIG. 8 is a perspective view of the carrying device being in the first clamping mode and having another configuration according to the first embodiment of the present disclosure.
Figure 9:
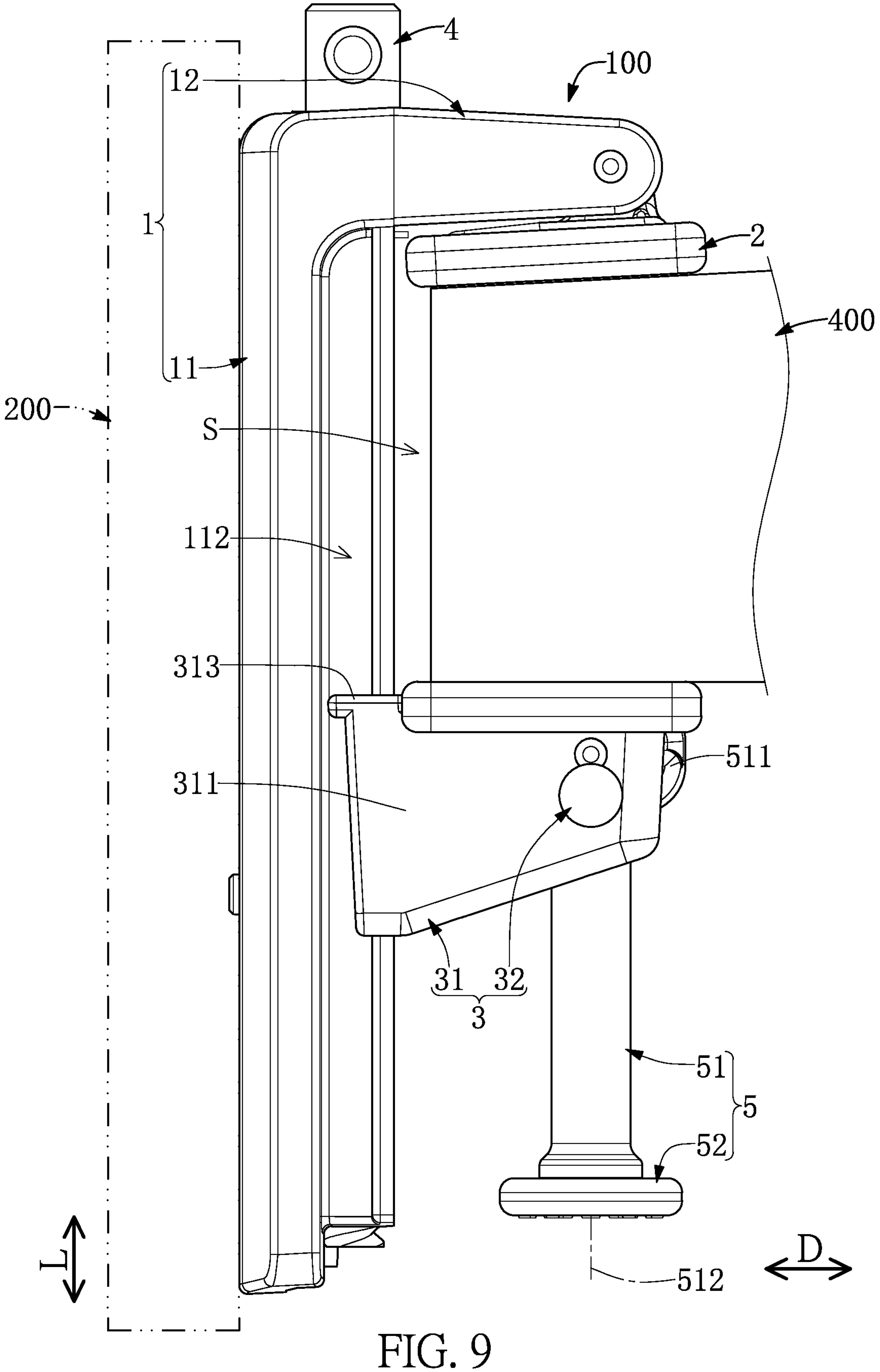
FIG. 9 is a planar view showing the carrying device that is in the second clamping mode and that is used to clamp a second structure.

Referring to FIG. 1 to FIG. 9, a first embodiment of the present disclosure provides a carrying device 100 configured to allow an object 200 to be detachably assembled thereon (as shown in FIG. 7 and FIG. 9). The carrying device 100 is configured to selectively clamp one of a first structure 300 (shown in FIG. 7) and a second structure 400 (as shown in FIG. 9) that is different from the first structure 300. The first structure 300 includes a plate part 201 and an extension part 302 that curvedly (e.g., perpendicularly) extends from the plate part 301, and the second structure 400 is in a block shape, a strip shape, or a platy shape. In the present embodiment, a thickness of the first structure 300 is less than a thickness of the second structure 400. Specifically, the thickness of the first structure 300 is less than 10 mm, and the thickness of the second structure 400 is within a range from 30 mm to 40 mm, but the present disclosure is not limited thereto.

It should be noted that the carrying device 100 in the present embodiment is implemented in an outdoor environment, the first structure 300 and the second structure 400 are windowsills having different configurations, and the object 200 is a customer premise equipment (CPE), but the present disclosure is not limited thereto.

As shown in FIG. 1 to FIG. 5, the carrying device 100 includes a stand 1, an upper clamp 2 connected to the stand 1, a lower clamp 3 assembled to the stand 1, a manipulation mechanism 4 assembled to the stand 1 and interlinked with the lower clamp 3, and a supporting column 5 that is assembled to the lower clamp 3.

Figure 2:
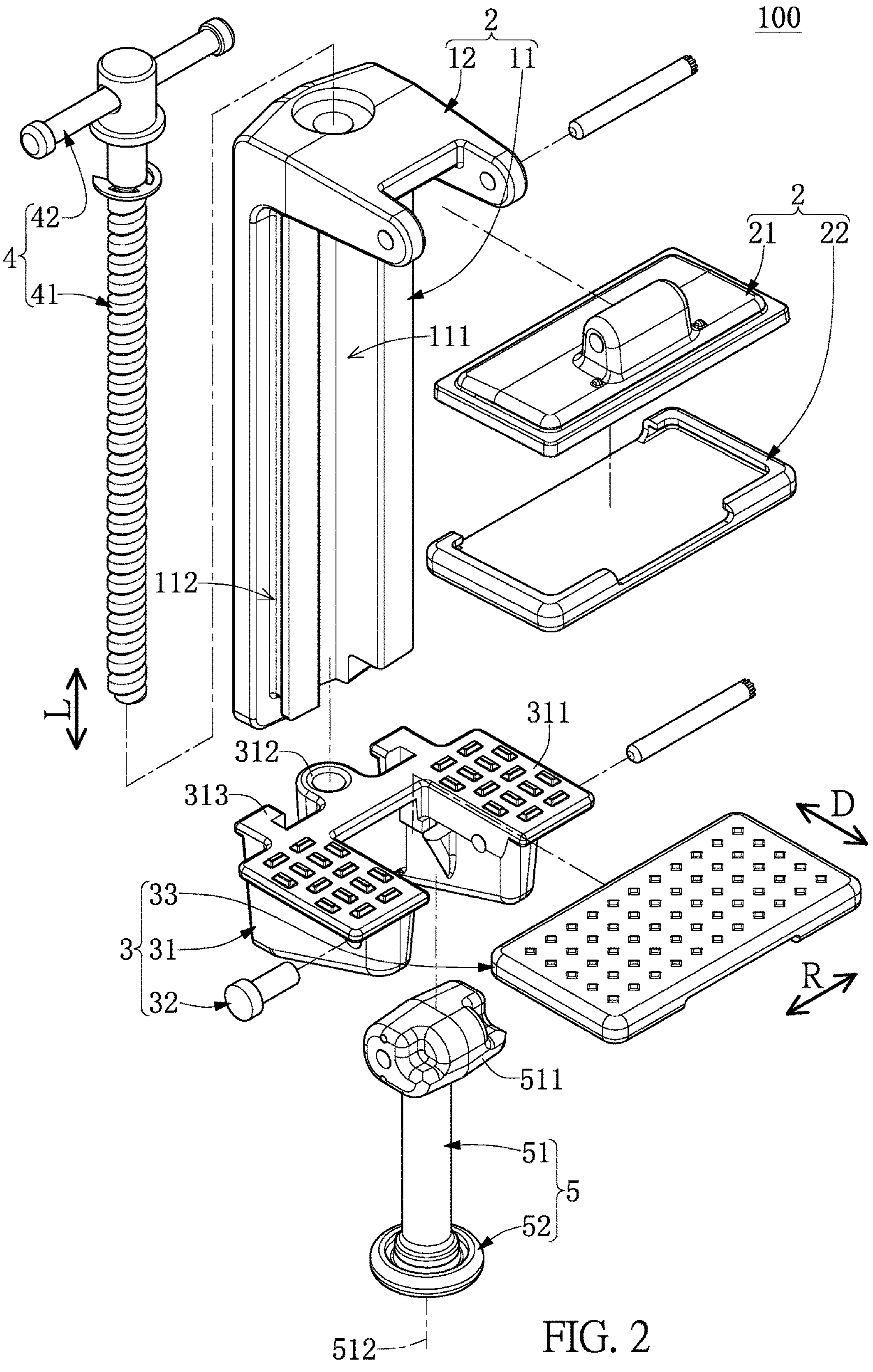
FIG. 2 is an exploded view of FIG. 1.

In the present embodiment, as shown in FIG. 1, FIG. 2, and FIG. 5, the stand 1 is a substantially L-shaped structure and is configured to allow the object 200 to be detachably assembled thereon, and the stand 1 preferably includes a track structure 11 and an assembling portion 12 that is perpendicularly connected to the track structure 11, but the present disclosure is not limited thereto. A longitudinal direction of the track structure 11 is parallel to a straight direction L, and the track structure 11 includes an inner channel 111 and two outer tracks 112 that are respectively arranged at two opposite sides of the inner channel 111.

The upper clamp 2 is pivotally connected to the assembling portion 12 of the stand 1 and is substantially located at an inner side of the stand 1. The upper clamp 2 includes an upper seat 21 and an upper antiskid pad 22 that is assembled to the upper seat 21. The upper seat 21 is pivotally connected to the stand 1 (e.g., the assembling portion 12) along a shaft direction R perpendicular to the track structure 11 (or the straight direction L), and the upper antiskid pad 22 faces toward the lower clamp 3.

Specifically, the upper seat 21 is pivotally rotatable relative to the assembling portion 12 so as to adjust an angle therebetween. The upper antiskid pad 22 is substantially in a sheet-shape, and is detachably assembled to and covers the upper seat 21. The upper antiskid pad 22 has a plurality of protrusions arranged on a bottom surface thereof. When the bottom surface of the upper antiskid pad 22 is substantially perpendicular to the straight direction L, the upper antiskid pad 22 and the track structure 11 are spaced apart from each other by a first reserved distance D1 along a depth direction D that is perpendicular to the straight direction L and the shaft direction R.

The lower clamp 3 is assembled to the track structure 11 (e.g., the two outer tracks 112) and faces toward the upper clamp 2, so that the lower clamp 3 is movable along the track structure 11 relative to the upper clamp 2, and the upper clamp 2 and the lower clamp 3 jointly define a receiving space S therebetween.

The lower clamp 3 in the present embodiment includes a lower seat 31, a retainer 32 (e.g., a pin or a bolt) assembled to the lower seat 31, and a lower antiskid pad 33 that is assembled to the lower seat 31, but the present disclosure is not limited thereto. For example, in other embodiments of the present disclosure, the lower clamp 3 can be provided by omitting at least one of the retainer 32 and the lower antiskid pad 33 according to design requirements.

Specifically, the lower seat 31 in the present embodiment includes a main portion 311, an interlinked portion 312 connected to the main portion 311, and two sliding portions 313 that are connected to the main portion 311 and that are respectively arranged at two opposite sides of the interlinked portion 312. The interlinked portion 312 is arranged in the inner channel 111, and the two sliding portions 313 are respectively and slidably arranged in the two outer tracks 112 along the straight direction L, so that the lower seat 31 is assembled to the track structure 11, but the present disclosure is not limited thereto.

Moreover, the lower antiskid pad 33 is substantially in a sheet-shape, and is detachably assembled to and covers the main portion 311. The lower antiskid pad 33 has a plurality of protrusions arranged on a top surface thereof. The lower antiskid pad 33 faces toward the upper clamp 2 (e.g., the upper antiskid pad 22), the top surface of the lower antiskid pad 33 is substantially perpendicular to the straight direction L, and the lower antiskid pad 33 and the track structure 11 are spaced apart from each other along the depth direction D by a distance that is substantially equal to the first reserved distance D1.

The manipulation mechanism 4 is interlinked with the lower seat 31 of the lower clamp 3, so that the manipulation mechanism 4 can be configured to drive the lower clamp 3 to move along the track structure 11 (or the straight direction L). The lower clamp 3 is movable in a direction away from the upper clamp 2 through the manipulation mechanism 4 so as to enable the lower clamp 3 to be spaced apart from the upper clamp 2 by a maximum distance Dmax.

Specifically, the manipulation mechanism 4 includes a screw rod 41 and a manipulation rod 42 that is connected to the screw rod 41. The screw rod 41 passes through the stand 1 and is arranged in the inner channel 111, and is screwed to the lower seat 31 (e.g., the interlinked portion 312). The manipulation rod 42 is arranged adjacent to the assembling portion 12, and is configured to rotate the screw rod 41 so as to allow the lower seat 31 to move in a fixed interval along the track structure 11.

Figure 3:
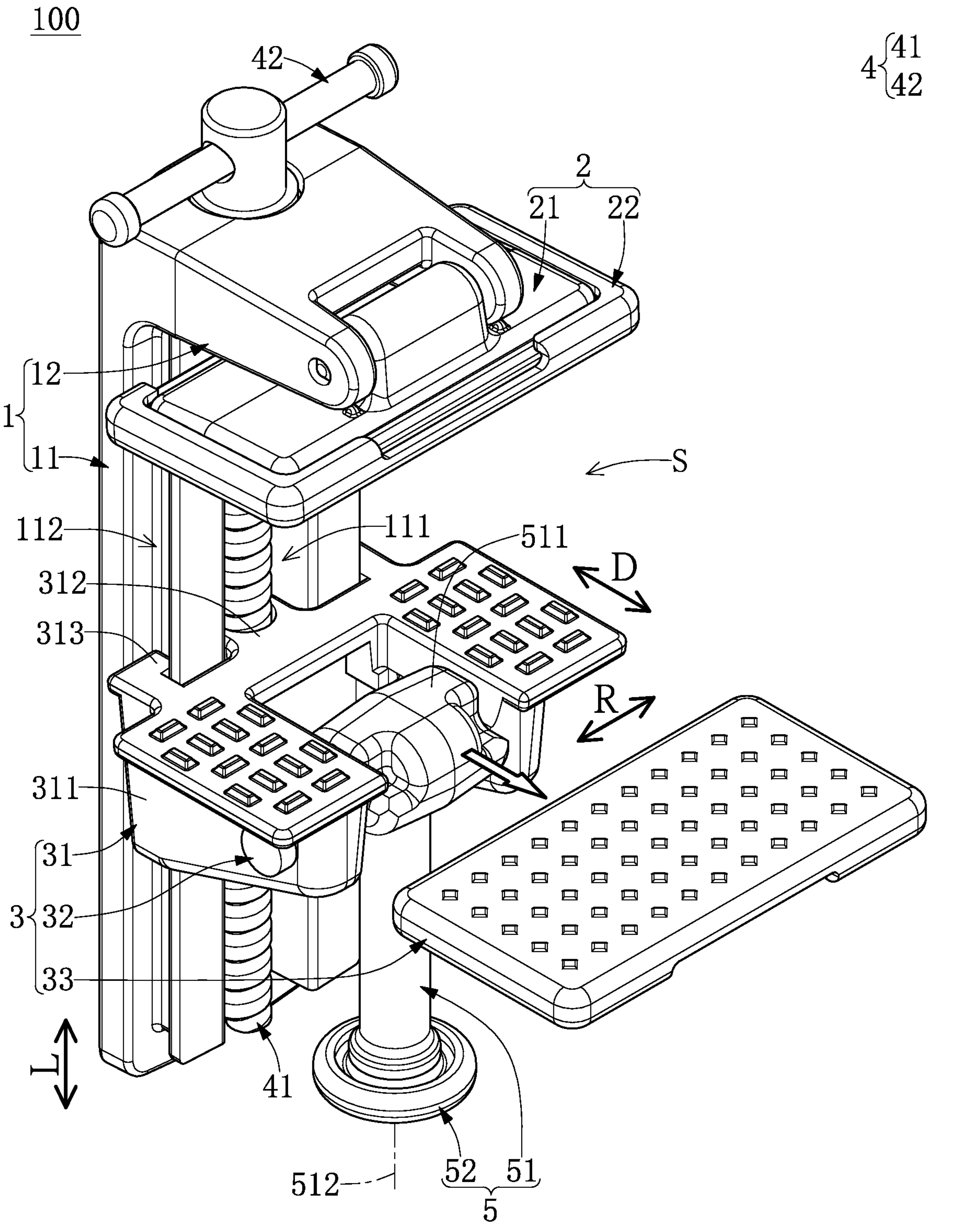
FIG. 3 is a perspective view showing the carrying device of FIG. 1 in process to switch clamping mode.
Figure 4:
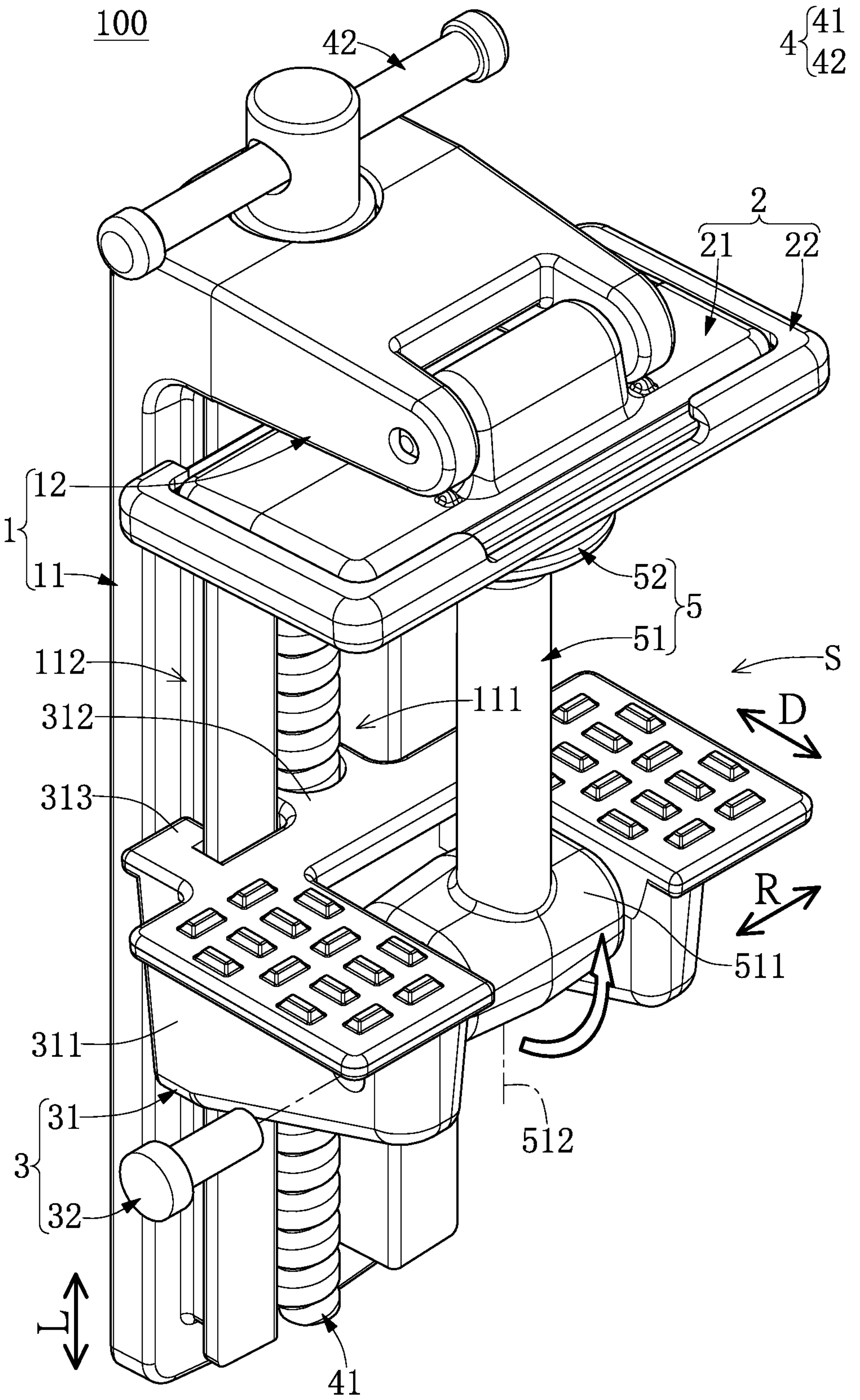
FIG. 4 is a perspective view of the carrying device being in a first clamping mode according to the first embodiment of the present disclosure.

The supporting column 5 is movable relative to the lower clamp 3, so that the carrying device 100 is adjustable to be in a first clamping mode (shown in FIG. 4) or a second clamping mode (shown in FIG. 1). In the present embodiment, the supporting column 5 has a free end portion 52 and an assembling end portion 511 that is opposite to the free end portion 52 (i.e., the assembling end portion 511 is arranged away from the free end portion 52). Furthermore, the assembling end portion 511 is pivotally connected to the lower clamp 3 (e.g., the main portion 311 of the lower seat 31) along the shaft direction R, so that the supporting column 5 is rotatable relative to the lower clamp 3 for allowing the carrying device 100 to be in the first clamping mode or the second clamping mode. However, as shown in FIG. 3 and FIG. 4 of the present embodiment, the lower antiskid pad 33 needs to be removed from the lower seat 31, thereby allowing the supporting column 5 to rotate relative to the lower clamp 3, but the present disclosure is not limited thereto.

Specifically, as shown in FIG. 1, FIG. 2, and FIG. 5, the supporting column 5 includes a column portion 51 having the assembling end portion 511 arranged on one end thereof, and the free end portion 52 is an antiskid pad rotatably assembled to another end of the column portion 51. The column portion 51 defines a central axis 512, and the free end portion 52 is rotatable relative to a plane perpendicular to the central axis 512 within an angle range that is less than or equal to 10 degrees.

In summary, when the supporting column 5 is located in the receiving space S by being rotated relative to the lower clamp 3, the retainer 32 is configured to be inserted into the assembling end portion 511 of the supporting column 5 so that the supporting column 5 is held firmly in place, thereby allowing the carrying device 100 to stay firmly in the first clamping mode.

Specifically, as shown in FIG. 5 to FIG. 7, when the carrying device 100 is in the first clamping mode, the supporting column 5 is located in the receiving space S, the free end portion 52 of the supporting column 5 faces toward the upper clamp 2, and the manipulation mechanism 4 is configured to drive the lower clamp 3 and the supporting column 5 to move together, so that the free end portion 52 and the upper clamp 3 are capable of jointly clamping the plate part 301 of the first structure 300.

Moreover, when the carrying device 100 is in the first clamping mode, the supporting column 5 and the track structure 11 are spaced apart from each other along the depth direction D, so that a space between the supporting column 5 and the track structure 11 (e.g., the supporting column 5 and the track structure 11 are spaced apart from each other by a second reserved distance D2 greater than the first reserved distance D1) is configured to allow the extension part 302 of the first structure 300 to be disposed therein.

In summary, by moving the supporting column 5 into the receiving space S, the supporting column 5 and the upper clamp 2 of the carrying device 100 in the present embodiment can cooperate with each other to jointly clamp the first structure 300, so that a moving distance of the lower clamp 3 can be effectively decreased (e.g., the moving distance of the lower clamp 3 can be substantially decreased by a length of the supporting column 5), and a manipulation time of the manipulation mechanism 4 can be significantly reduced. Accordingly, the carrying device 100 provided by the present embodiment can be different from the existing structure.

Specifically, when the carrying device 100 provided by the present embodiment is in the first clamping mode, each of the upper clamp 2 and the free end portion 52 of the supporting column 5 is rotatable, so that the upper clamp 2 and the supporting column 5 can firmly clamp surfaces of the plate part 301 having different slanting angles.

Moreover, when the carrying device 100 provided by the present embodiment is in the first clamping mode, the space between the supporting column 5 and the track structure 11 (e.g., the supporting column 5 and the track structure 11 are spaced apart by the second reserved distance D2) is configured to allow the extension part 302 having a non-platy shape to be disposed therein, so that the carrying device 100 can be used to clamp variety structures.

In addition, the carrying device 100 being in the first clamping mode described in the present embodiment is operated to clamp the plate part 301 of the first structure 300, but the present disclosure is not limited thereto. For example, in other embodiments of the present disclosure, the carrying device 100 being in the first clamping mode can be operated to clamp the second structure 400.

It should be noted that when the carrying device 100 is in the first clamping mode, the lower clamp 3 shown in FIG. 1 of the present embodiment needs to remove the lower antiskid pad 33 from the lower seat 31, thereby allowing the supporting column 5 and the upper antiskid pad 22 of the upper clamp 2 to cooperate with each other for jointly clamping the plate part 301 of the first structure 300, but the present disclosure is not limited thereto.

For example, as shown in FIG. 8, the lower antiskid pad 33 has a notch 331; in other words, the lower antiskid pad 33 is substantially in a U-shape. When the carrying device 100 is in the first clamping mode, the supporting column 5 passes through the notch 331 of the lower antiskid pad 33 without removing the lower antiskid pad 33 from the lower seat 31, thereby allowing the supporting column 5 and the upper antiskid pad 22 of the upper clamp 2 to cooperate with each other for jointly clamping the plate part 301 of the first structure 300 (not shown in FIG. 8).

In addition, as shown in FIG. 1, FIG. 2, and FIG. 9, when the retainer 32 is removed from the assembling end portion 511 of the supporting column 5, the supporting column 5 can be disposed outside of the receiving space S by being rotated relative to the lower clamp 3, so that the carrying device 100 can be adjusted in the second clamping mode.

Specifically, when the carrying device 100 is in the second clamping mode, the supporting column 5 is located outside of the receiving space S, the receiving space S is configured to receive the second structure 400 being plate-shaped, and the manipulation mechanism 4 is configured to drive the lower clamp 3 to move, so that the lower clamp 3 and the upper clamp 2 are capable of jointly clamping the second structure 400.

As shown in FIG. 5, when the carrying device 100 is in the first clamping mode and the lower clamp 3 is spaced apart from the upper clamp 2 by the maximum distance Dmax, a distance D52 between the free end portion 52 and the upper clamp 2 is 40% to 50% of the maximum distance Dmax.

In other words, as shown in FIG. 5, FIG. 7, and FIG. 9, a thickness of the plate part 301 of the first structure 300 capable of being clamped by the carrying device 100 being in the first clamping mode is less than a thickness of the second structure 400 capable of being clamped by the carrying device 100 being in the second clamping mode.

Second Embodiment

Figure 10:
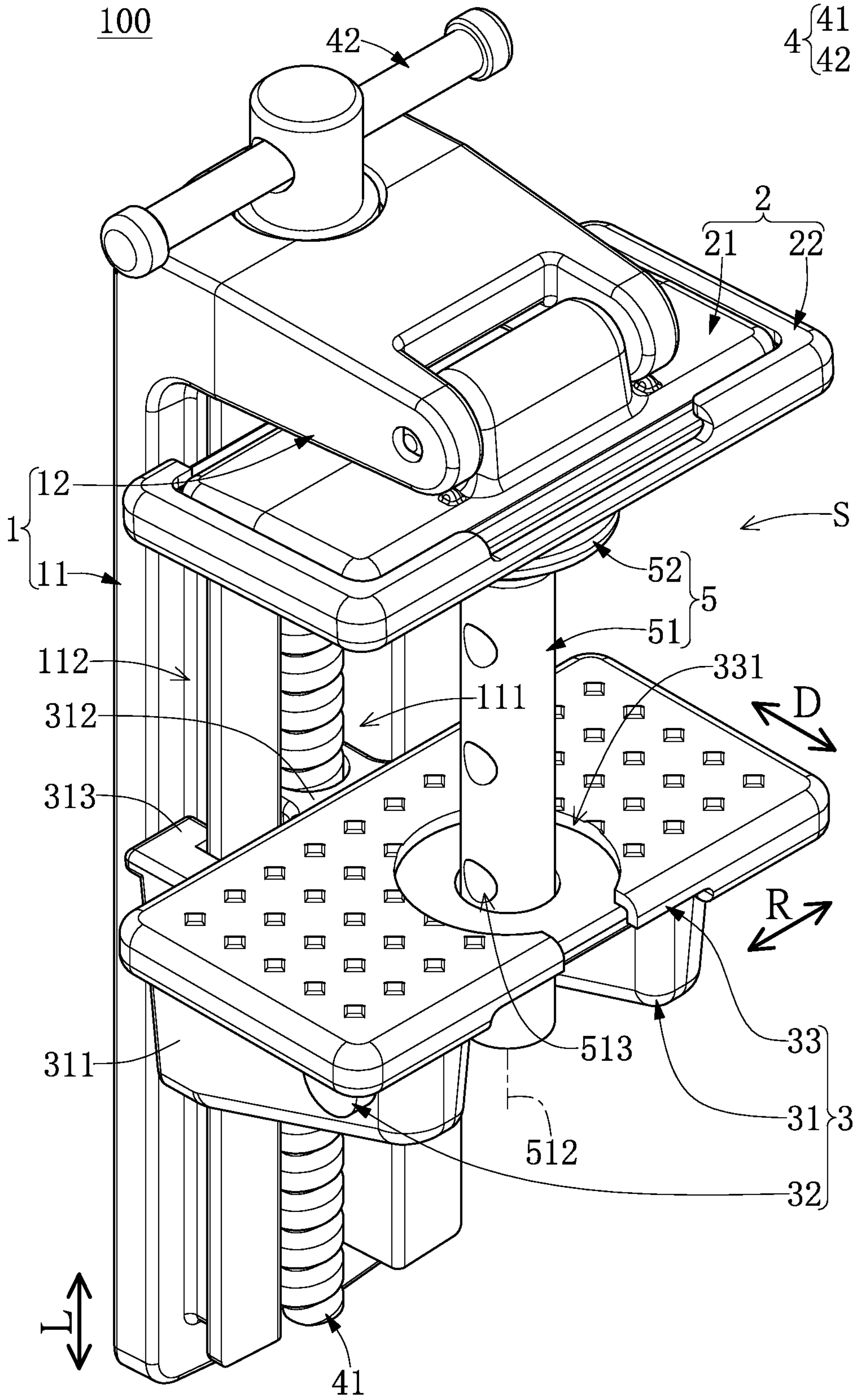
FIG. 10 is a perspective view of the carrying device being in the first clamping mode according to a second embodiment of the present disclosure.
Figure 11:
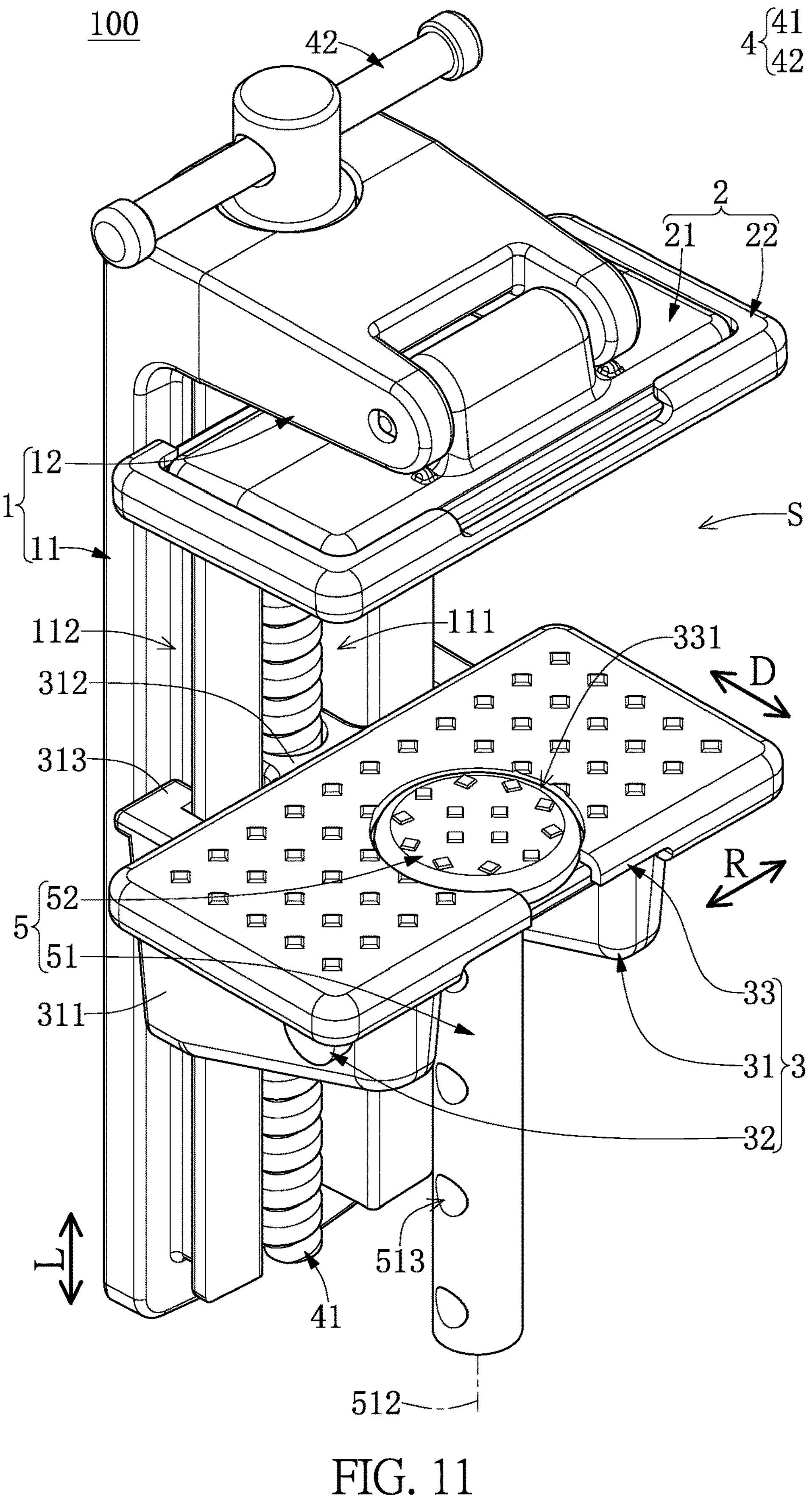
FIG. 11 is a perspective view of the carrying device being in the second clamping mode according to the second embodiment of the present disclosure.

Referring to FIG. 10 and FIG. 11, a second embodiment of the present disclosure is provided, which is similar to the first embodiment of the present disclosure. For the sake of brevity, descriptions of the same components in the first and second embodiments of the present disclosure will be omitted herein, and the following description only discloses different features between the first and second embodiments (e.g., connection relationships and relative movement between the lower clamp 3 and the supporting column 5).

Specifically, the supporting column 5 in the present embodiment is assembled to the lower clamp 3 without using a pivotal connection manner. Furthermore, the column portion 51 of the supporting column 5 has a plurality of thru-holes 513 spaced apart from each other and arranged along the central axis 512, and the supporting column 5 in the present embodiment is linearly movable relative to the lower clamp 3 along a direction (e.g., the straight direction L) parallel to the track structure 11, but the present disclosure is not limited thereto.

Accordingly, when the supporting column 5 is located in the receiving space S by being linearly moved toward the upper clamp 2 relative to the lower clamp 3, the retainer 32 is configured to be inserted into the supporting column 5 (e.g., any one of the thru-holes 513) so as to enable the carrying device 100 to be in the first clamping mode (as shown in FIG. 10). Moreover, when the retainer 32 is removed from the supporting column 5, the supporting column 5 can be linearly moved away from the upper clamp 2 relative to the lower clamp 3 for being located outside of the receiving space S, so that the carrying device 100 can be adjusted in the second clamping mode (as shown in FIG. 11).

Third Embodiment

Figure 12:
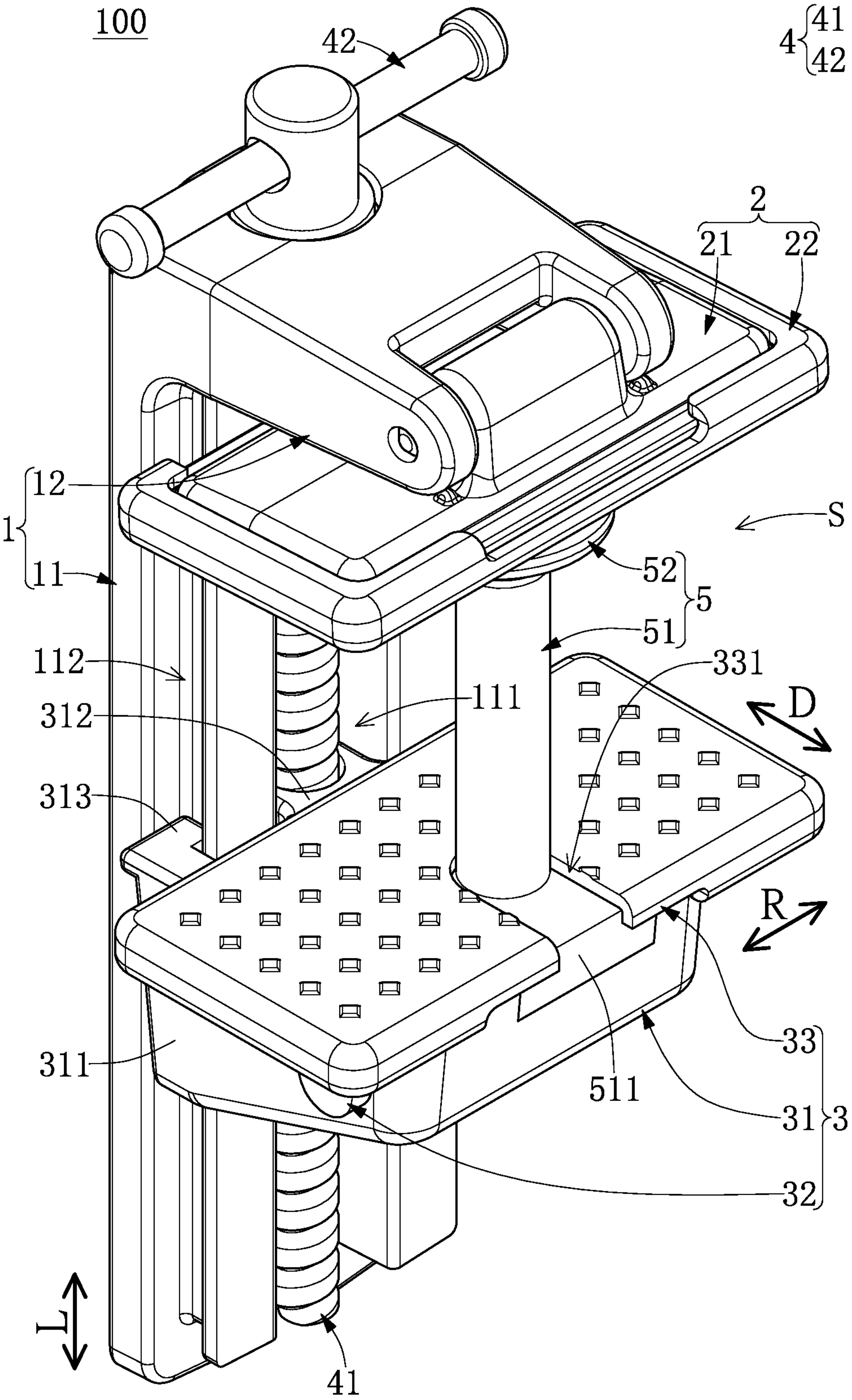
FIG. 12 is a perspective view of the carrying device being in the first clamping mode according to a third embodiment of the present disclosure.
Figure 13:
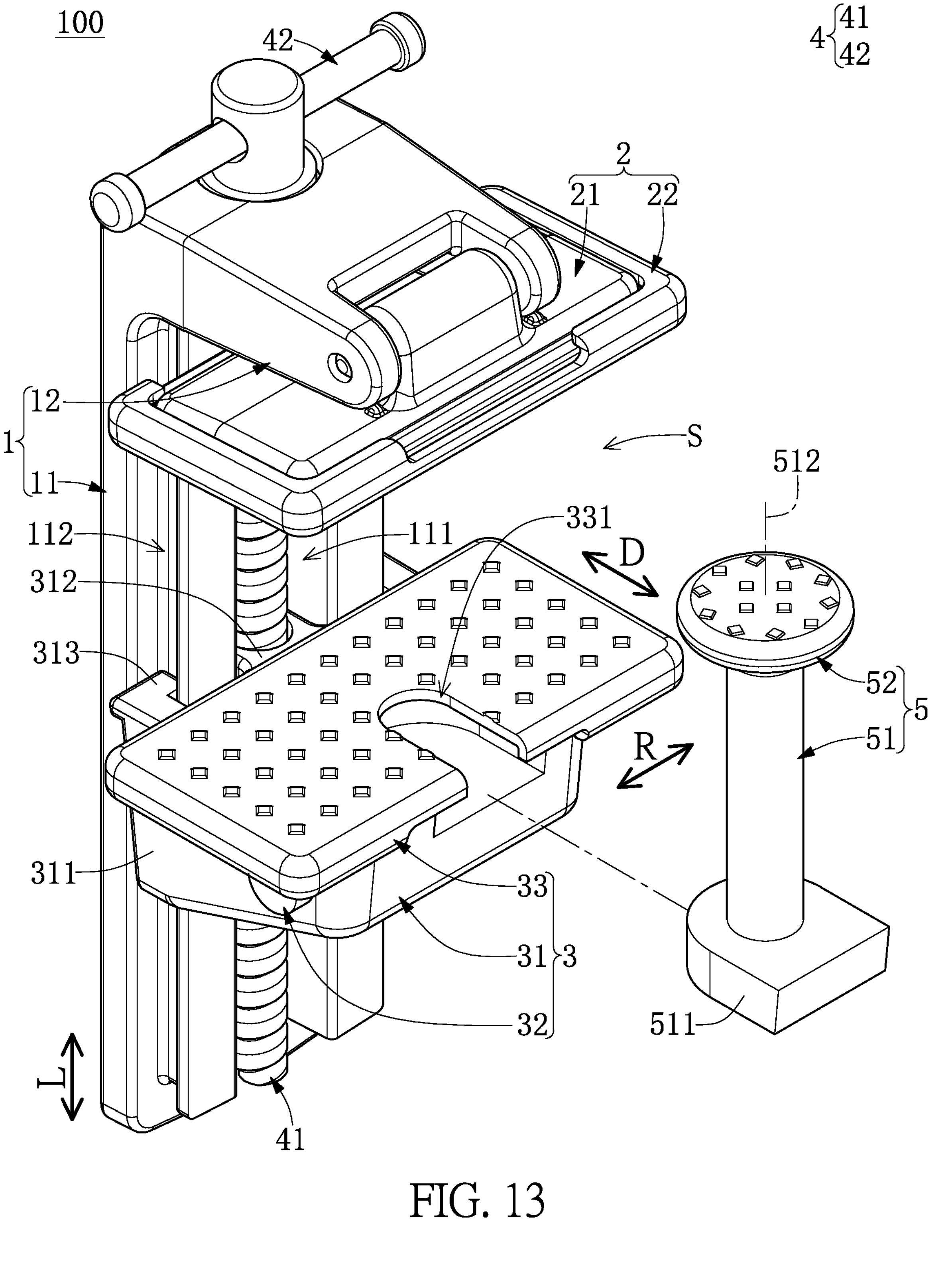
FIG. 13 is a perspective view of the carrying device being in the second clamping mode according to the third embodiment of the present disclosure.

Referring to FIG. 12 and FIG. 13, a third embodiment of the present disclosure is provided, which is similar to the first embodiment of the present disclosure. For the sake of brevity, descriptions of the same components in the first and third embodiments of the present disclosure will be omitted herein, and the following description only discloses different features between the first and third embodiments (e.g., connection relationships and relative movement between the lower clamp 3 and the supporting column 5).

In the present embodiment, the supporting column 5 is detachably assembled to the lower clamp 3 (e.g., the main portion 311 of the lower seat 31) and is located in the receiving space S, and the free end portion 52 of the supporting column 5 faces toward the upper clamp 2, so that the carrying device 100 is in the first clamping mode (as shown in FIG. 12).

When the carrying device 100 is in the first clamping mode, the manipulation mechanism 4 is configured to drive the lower clamp 3 and the supporting column 5 to move together, so that the free end portion 52 and the upper clamp 2 are capable of jointly clamping the plate part 301 of the first structure 300. Furthermore, when the carrying device 100 is in the first clamping mode, the supporting column 5 and the track structure 11 are spaced apart from each other along the depth direction D, so that a space between the supporting column 5 and the track structure 11 is configured to allow the extension part 302 of the first structure 300 to be disposed therein.

When the supporting column 5 is detached from the lower clamp 3, the carrying device 100 is in the second clamping mode (as shown in FIG. 13), the receiving space S is configured to receive the second structure 400 being plate-shaped, and the manipulation mechanism 4 is configured to drive the lower clamp 3 to move, so that the lower clamp 3 and the upper clamp 2 are capable of jointly clamping the second structure 400.

It should be noted that when the carrying device 100 is in one of the first clamping mode and the second clamping mode, connection relationships of the components of the carrying device 100, the first structure 300, and the second structure 400 of the present embodiment are substantially identical to that of the first embodiment and will be omitted herein for the sake of brevity.

Beneficial Effects of the Embodiments

In conclusion, by moving or assembling the supporting column into the receiving space, the supporting column and the upper clamp of the carrying device in the present disclosure can cooperate with each other to jointly clamp the first structure, so that a moving distance of the lower clamp can be effectively decreased (e.g., the moving distance of the lower clamp can be substantially decreased by a length of the supporting column), and a manipulation time of the manipulation mechanism can be significantly reduced. Accordingly, the carrying device provided by the present disclosure can be different from the existing structure.

Specifically, when the carrying device provided by the present disclosure is in the first clamping mode, the space between the supporting column and the track structure (e.g., the supporting column and the track structure are spaced apart from by the second reserved distance) is configured to allow the extension part having a non-platy shape to be disposed therein, so that the carrying device can be used to clamp a variety of structures. Moreover, each of the upper clamp and the free end portion of the supporting column is rotatable, so that the upper clamp and the supporting column can firmly clamp surfaces of the plate part having different slanting angles.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A carrying device, comprising:

a stand having a track structure and configured to allow an object to be detachably assembled thereon, wherein a longitudinal direction of the track structure defines a straight direction;

an upper clamp connected to the stand;

a lower clamp assembled to the track structure and facing toward the upper clamp along the straight direction, wherein the lower clamp has a notch and is movable along the track structure relative to the upper clamp, and the upper clamp and the lower clamp jointly define a receiving space therebetween;

a manipulation mechanism assembled to the stand and interlinked with the lower clamp, wherein the manipulation mechanism is configured to drive the lower clamp to move along the track structure; and a supporting column assembled to the lower clamp, wherein the supporting column is movable relative to the lower clamp, so that the carrying device is adjustable to be in a first clamping mode or a second clamping mode;

wherein, when the carrying device is in the first clamping mode, the supporting column is located in the receiving space and passes through the notch, a free end portion of the supporting column faces toward the upper clamp, the manipulation mechanism is configured to drive the lower clamp and the supporting column to move together along the straight direction, the free end portion of the supporting column and the upper clamp are configured to jointly clamp a plate part of a first structure along the straight direction, and the lower clamp is free of contact with the first structure.

2. The carrying device according to claim 1, wherein, when the carrying device is in the first clamping mode, the supporting column and the track structure are spaced apart from each other, so that a space between the supporting column and the track structure is configured to allow an extension part of the first structure, which extends curvedly from the plate part, to be disposed therein.

3. The carrying device according to claim 1, wherein, when the carrying device is in the second clamping mode, the supporting column is located outside of the receiving space, the receiving space is configured to receive a second structure being plate-shaped, and the manipulation mechanism is configured to drive the lower clamp to move, so that the lower clamp and the upper clamp are capable of jointly clamping the second structure.

4. The carrying device according to claim 3, wherein a thickness of the plate part of the first structure capable of being clamped by the carrying device in the first clamping mode is less than a thickness of the second structure capable of being clamped by the carrying device in the second clamping mode.

5. The carrying device according to claim 1, wherein the supporting column has an assembling end portion arranged away from the free end portion, and wherein the assembling end portion is pivotally connected to the lower clamp along a shaft direction perpendicular to the track structure, so that the supporting column is rotatable relative to the lower clamp.

6. The carrying device according to claim 5, wherein the lower clamp includes a lower seat and a retainer that is assembled to the lower seat, and the lower seat is assembled to the track structure and is interlinked with the manipulation mechanism, and wherein, when the supporting column is located in the receiving space by being rotated relative to the lower clamp, the retainer is configured to be inserted into the assembling end portion of the supporting column so as to enable the carrying device to be in the first clamping mode.

7. The carrying device according to claim 6, wherein the lower clamp includes a lower antiskid pad assembled to the lower seat, and the lower antiskid pad faces toward the upper clamp and has the notch.

8. The carrying device according to claim 1, wherein the lower clamp is movable in a direction away from the upper clamp through the manipulation mechanism so as to enable the lower clamp to be spaced apart from the upper clamp by a maximum distance, and wherein, when the carrying device is in the first clamping mode and the lower clamp is spaced apart from the upper clamp by the maximum distance, a distance between the free end portion and the upper clamp is 40% to 50% of the maximum distance.

9. The carrying device according to claim 1, wherein the upper clamp includes an upper seat and an upper antiskid pad that is assembled to the upper seat, and wherein the upper seat is pivotally connected to the stand along a shaft direction perpendicular to the track structure, and the upper antiskid pad faces toward the lower clamp.

10. The carrying device according to claim 9, wherein the lower clamp includes a lower seat and a lower antiskid pad that is assembled to the lower seat, and wherein the lower seat is assembled to the track structure and is interlinked with the manipulation mechanism, and the lower antiskid pad faces toward the upper antiskid pad.

11. The carrying device according to claim 10, wherein the manipulation mechanism includes a screw rod and a manipulation rod that is connected to the screw rod, and wherein the screw rod passes through the stand and is screwed to the lower seat, and the manipulation rod is configured to rotate the screw rod so as to allow the lower seat to move along the track structure.

12. A carrying device, comprising:

a stand having a track structure and configured to allow an object to be detachably assembled thereon;

an upper clamp connected to the stand;

a lower clamp assembled to the track structure and facing toward the upper clamp, wherein the lower clamp is movable along the track structure relative to the upper clamp, and the upper clamp and the lower clamp jointly define a receiving space therebetween;

a manipulation mechanism assembled to the stand and interlinked with the lower clamp, wherein the manipulation mechanism is configured to drive the lower clamp to move along the track structure; and a supporting column assembled to the lower clamp, wherein the supporting column is movable relative to the lower clamp, so that the carrying device is adjustable to be in a first clamping mode or a second clamping mode;

wherein, when the carrying device is in the first clamping mode, the supporting column is located in the receiving space, a free end portion of the supporting column faces toward the upper clamp, and the manipulation mechanism is configured to drive the lower clamp and the supporting column to move together, so that the free end portion and the upper clamp are capable of jointly clamping a plate part of a first structure;

wherein the lower clamp includes a lower antiskid pad, and the lower antiskid pad faces toward the upper clamp and has a notch, and wherein, when the carrying device is in the first clamping mode, the supporting column passes through the notch of the lower antiskid pad.

13. The carrying device according to claim 12, wherein the supporting column includes a column portion, and the free end portion is an antiskid pad rotatably assembled to the column portion, and wherein the column portion defines a central axis, and the free end portion is rotatable relative to a plane perpendicular to the central axis in an angle range that is less than or equal to 10 degrees.

* * * * *